US010574387B2

(12) United States Patent
Davydov et al.

(10) Patent No.: US 10,574,387 B2
(45) Date of Patent: Feb. 25, 2020

(54) NON-ORTHOGONAL SUPERPOSITION TRANSMISSIONS FOR MULTIMEDIA BROADCAST MULTICAST SERVICE (MBMS)

(71) Applicant: INTEL CORPORATION, Santa Clara, CA (US)

(72) Inventors: Alexei Davydov, Nizhny Novgorod (RU); Vadim Sergeyev, Nizhny Novgorod (RU); Alexander Maltsev, Nizhny Novgorod (RU)

(73) Assignee: INTEL CORPORATION, Santa Clara, CA (US)

(*) Notice: Subject to any disclaimer, the term of this patent is extended or adjusted under 35 U.S.C. 154(b) by 29 days.

(21) Appl. No.: 15/557,067

(22) PCT Filed: Oct. 30, 2015

(86) PCT No.: PCT/US2015/058399
§ 371 (c)(1),
(2) Date: Sep. 8, 2017

(87) PCT Pub. No.: WO2016/164069
PCT Pub. Date: Oct. 13, 2016

(65) Prior Publication Data
US 2018/0069651 A1 Mar. 8, 2018

Related U.S. Application Data

(60) Provisional application No. 62/144,771, filed on Apr. 8, 2015.

(51) Int. Cl.
*H04J 3/06* (2006.01)
*H04L 1/00* (2006.01)
(Continued)

(52) U.S. Cl.
CPC .......... *H04L 1/0003* (2013.01); *H04L 1/0001* (2013.01); *H04L 1/0025* (2013.01);
(Continued)

(58) Field of Classification Search
CPC combination set(s) only.
See application file for complete search history.

(56) References Cited

U.S. PATENT DOCUMENTS

2009/0249027 A1* 10/2009 Kim .................. H04L 25/03866
712/5
2010/0034076 A1* 2/2010 Kishiyama ............ H04J 11/005
370/210
(Continued)

FOREIGN PATENT DOCUMENTS

JP 2014204277 A 10/2014
WO WO 2010058466 A1 5/2010
WO WO 2010076403 A1 7/2010

OTHER PUBLICATIONS

Goto Jungo et al: A Frequency Domain Scheduling for Uplink Single Carrier Non-orthogonal Multiple Access with Iterative Interference Cancellation; IEEE 80th Vehicular Technology Conference; Sep. 14, 2014.
(Continued)

*Primary Examiner* — Siren Wei
(74) *Attorney, Agent, or Firm* — Thorpe North & Western

(57) ABSTRACT

Technology for an eNodeB operable to perform multiuser non-orthogonal superposition transmissions for multimedia broadcast multicast service (MBMS) is disclosed. The eNodeB can modulate a first physical multicast channel (PMCH) signal for MBMS with a first modulation and coding scheme (MCS). The eNodeB can modulate a second PMCH signal for MBMS with a second MCS. The eNodeB can multiplex the first PMCH signal and the second PMCH signal to form an aggregate PMCH signal. The eNodeB can transmit the aggregate PMCH signal to a plurality of UEs using multiuser non-orthogonal superposition for MBMS, wherein the first PMCH signal in the aggregate PMCH signal is transmitted using physical resource blocks (PRBs) that are par-
(Continued)

tially or fully overlapped in time and frequency with PRBs of the second PMCH signal in the aggregate PMCH signal.

20 Claims, 10 Drawing Sheets

(51) Int. Cl.
*H04W 72/00* (2009.01)
*H04L 27/34* (2006.01)
*H04L 5/00* (2006.01)
*H04W 4/06* (2009.01)
*H04W 72/04* (2009.01)

(52) U.S. Cl.
CPC .......... *H04L 1/0048* (2013.01); *H04L 5/0001* (2013.01); *H04L 5/0037* (2013.01); *H04L 27/345* (2013.01); *H04L 27/3488* (2013.01); *H04W 72/005* (2013.01); *H04L 2001/0093* (2013.01); *H04W 4/06* (2013.01); *H04W 72/04* (2013.01)

(56) References Cited

U.S. PATENT DOCUMENTS

| | | | |
|---|---|---|---|
| 2011/0135029 A1* | 6/2011 | Jianming | H04L 27/3411 375/286 |
| 2013/0286926 A1* | 10/2013 | Zhang | H04W 56/0015 370/312 |
| 2014/0233407 A1* | 8/2014 | Pourahmadi | H04L 5/0007 370/252 |
| 2016/0013897 A1* | 1/2016 | Sun | H04L 1/0058 370/312 |
| 2018/0020426 A1* | 1/2018 | Yi | H04W 4/06 |

OTHER PUBLICATIONS

Alberto G. Perotti et al: Non-Orthogonal Multiple Access for Degraded Broadcast Channels: RA-CEMA; Oct. 21, 2014.

Benjebbour Anass et al: Concept and Practical Considerations of Non-orthogonal Multiple Access (NOMA) for Future Radio Access; IEEE International Symposium on Intelligent Signal Processing and Communications Systems; Nov. 12, 2013.

* cited by examiner

*PMCH-InfoList information element*

```
-- ASN1START

PMCH-InfoList-r9 ::=            SEQUENCE (SIZE (0..maxPMCH-PerMBSFN)) OF PMCH-
Info-r9

PMCH-InfoListExt-r12 ::=        SEQUENCE (SIZE (0..maxPMCH-PerMBSFN)) OF PMCH-
InfoExt-r12

PMCH-InfoExt-r12 ::=            SEQUENCE {
    pmch-Config-r12                 PMCH-Config-r12,
    mbms-SessionInfoList-r12        MBMS-SessionInfoList-r9,
    ...
}

...

PMCH-Config-r12 ::=             SEQUENCE {
    sf-AllocEnd-r12                 INTEGER (0..1535), dataMCS-r12                     CHOICE {
        t1-r12                          INTEGER (0..28),
        t2-r12                          INTEGER (0..27)
    },
    mch-SchedulingPeriod-r12        ENUMERATED {
                                    rf4, rf8, rf16, rf32, rf64, rf128, rf256,
rf512, rf1024},
    ...
}

-- ASN1STOP
```

FIG. 6

NON-ORTHOGONAL SUPERPOSITION TRANSMISSIONS FOR MULTIMEDIA BROADCAST MULTICAST SERVICE (MBMS)

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 6 is abstract syntax notation (ASN) code describing a physical multicast channel (PMCH) information list information element (IE) in accordance with an example;

Figure 1:
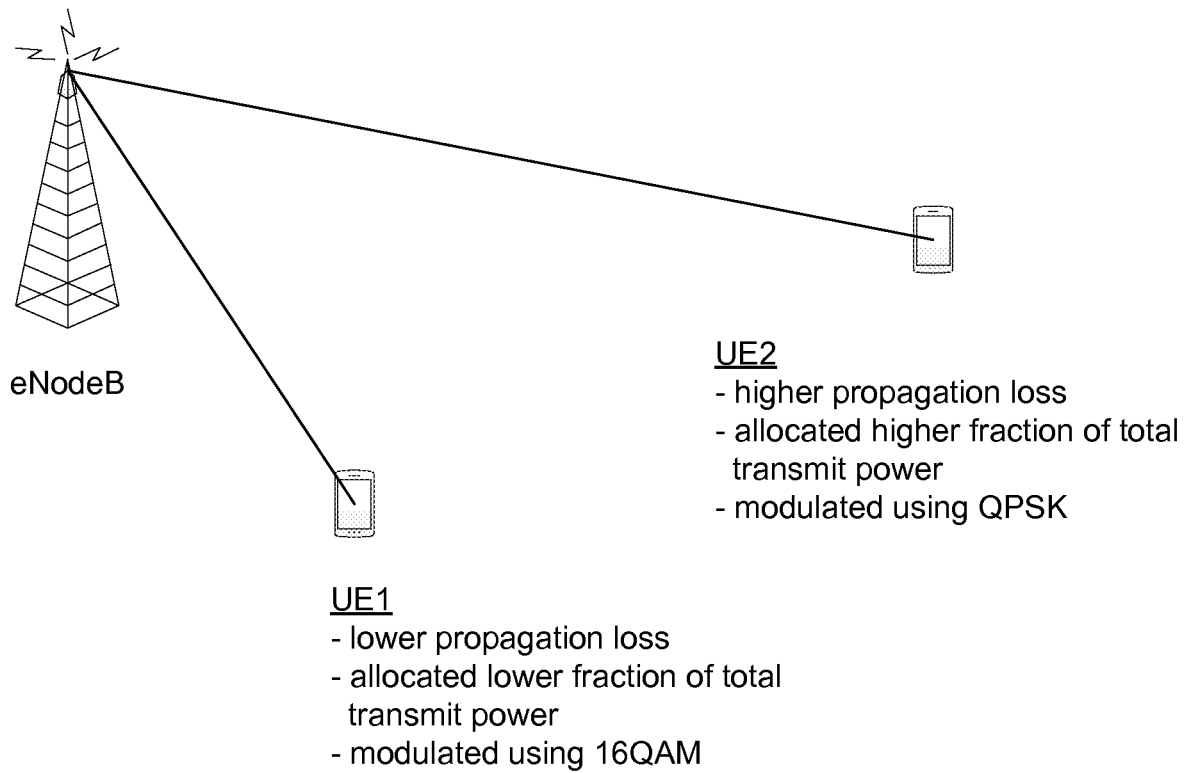
FIG. 1 illustrates a base station that is serving a first user equipment (UE) and a second UE in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A technology is described for performing, at an eNodeB, multiuser non-orthogonal superposition transmissions for multimedia broadcast multicast service (MBMS). The eNodeB can modulate a first physical multicast channel (PMCH) signal for MBMS with a first modulation and coding scheme (MCS). The eNodeB can modulate a second PMCH signal for MBMS with a second MCS. The eNodeB can multiplex the first PMCH signal and the second PMCH signal to form an aggregate PMCH signal. The eNodeB can transmit the aggregate PMCH signal to a plurality of UEs using multiuser non-orthogonal superposition for MBMS. In one example, the first PMCH signal in the aggregate PMCH signal can be transmitted using physical resource blocks (PRBs) that are partially or fully overlapped in time and frequency with PRBs of the second PMCH signal in the aggregate PMCH signal.

In one configuration, the eNodeB can send, to the UE, a power offset parameter that indicates a power split ratio between the first PMCH signal and the second PMCH signal in the aggregate PMCH signal. The eNodeB can send, to the UE, a modulation and coding scheme (MCS) for each of the first PMCH signal and the second PMCH signal in the aggregate PMCH signal. In addition, the eNodeB can send, to the UE, a scrambling identity for each of the first PMCH signal and the second PMCH signal in the aggregate PMCH signal. The UE can decode at least one of the first PMCH signal or the second PMCH signal in the aggregate PMCH signal using the power offset parameter, the MCS, and the scrambling identity for each of the first PMCH signal and the second PMCH signal in the aggregate PMCH signal.

In conventional 3GPP LTE Advanced (LTE-A) systems, as standardized in March 2011 as 3GPP Release 10, physical channels are transmitted by performing orthogonal multiplexing of the resources. For example, when an eNodeB performs scheduling on a group of UEs, the eNodeB can use distinct time and frequency resources for each of the UEs, such as distinct physical resource blocks (PRBs). In other words, the eNodeB can transmit signals to the UEs using different sub carriers or orthogonal frequency-division multiple access (OFDMA) symbols. As a result, different UEs can be assigned different time and frequency resources (i.e., different PRBs).

In view of typical LTE-A deployments, the distribution of users in one cell may cause a relatively large difference in distances between the eNodeB and the served UEs, and the relatively large difference in distances can be exploited to further improve spectral efficiency of downlink transmissions. More specifically, the spectral efficiency can be improved by using a non-orthogonal multiplexing scheme, in which the eNodeB can perform scheduling on the group of UEs using the same time and frequency resources, but the eNodeB can split the power amongst the signals sent to the group of UEs. The non-orthogonal multiplexing scheme implemented at the eNodeB can result in multi-user superposition transmissions from the eNodeB.

FIG. 1 illustrates an exemplary configuration of a base station that is serving a first user equipment (UE) and a second UE. The first UE can be referred to as UE1 and the second UE can be referred to as UE2. The first UE can be located relatively close to the base station, whereas the second UE can be located relatively far from the base station. In addition, the first UE and the second UE can have different propagation losses due to their distances to the base station. For example, the first UE can have a low propagation loss due to being relatively close to the base station, and the second UE can have a high propagation loss due to being relatively far from the base station. In other words, the second UE can experience higher propagation losses as compared to the first UE.

In LTE-A convention systems, the base station can serve the first UE and the second UE using OFDMA by allocating non-overlapping time and frequency resources, such as non-overlapping time and frequency physical resource blocks (PRBs). In other words, the base station can send two signals to the first UE and the second UE that are non-overlapping in time and frequency. However, when the base station uses non-orthogonal multiplexing, the eNodeB can use the superposition of two signals that are sent to the first UE and the second UE. The eNodeB can multiplex signals to the first UE and the second UE on the same time and frequency resources. More specifically, the eNodeB can multiplex the two signals using the power domain. The eNodeB can be limited to a certain transmit power (P). The eNodeB can split the transmit power (P) between the first signal and the second signal, and then the eNodeB can transmit the first and second signals simultaneously to the first and second UEs, respectively, over the same time and frequency resources.

In one example, when the eNodeB is configured to perform multiuser superposition transmission, the first UE and the second UE can be served in the same time frequency resources, and a total transmit power of the eNodeB can be divided into P1 and P2 for the first and second signals designated to the first and second UEs, respectively. In non-orthogonal multiplexing, first and second signals can be transmitted simultaneously over the same time and frequency resources. The signal power relative to noise for the first UE can be higher to that of the second UE, as the second UE has a larger propagation loss from the base station as compared to the first UE. The first signal received at the first UE can comprise a useful signal, signal interference due to the second signal transmitted to the second UE, and signal noise. Similarly, the second signal received at the second UE can comprise a useful signal, signal interference due to the first signal transmitted to the first UE, and signal noise. The first signal can cause intra-cell interference for the second UE, and the second signal can cause intra-cell interference for the first UE.

In one example, due to the first UE being closer to the base station as compared to the second UE (which results in lower propagation loss), a relative noise level can be lower for the first UE as compared to the second UE. In addition, since the first UE has a lower propagation loss as compared to the second UE, the signal to interference noise ratio (SINR) for the first UE is generally higher than the SINR for the second UE.

In one example, the first signal designated for the first UE can be allocated a relatively low fraction of the total transmit power, and the second signal designated for the second UE can be allocated a relatively high fraction of the total transmit power, based on the first UE being closer to the base station as compared to the second UE. In other words, the lower distance between the base station and the first UE results in a lower power being allocated to the first signal, and the higher distance between the base station and the second UE results in a higher power being allocated to the second signal.

In one example, the eNodeB can use a higher order modulation scheme to modulate the first signal for the first UE, and the eNodeB can use a lower order modulation scheme to modulate the second signal for the second UE. In one example, the higher order modulation scheme is 16 QAM (quadrature amplitude modulation) and the lower order modulation scheme is quadrature phase shift keying (QPSK). Therefore, 16 QAM can be used to modulate the signal allocated with a lower fraction of the total transmit power (i.e., the first signal), and QPSK can be used to modulate the signal allocated with a higher fraction of the total transmit power (i.e., the second signal). In this example, the higher order modulation scheme (i.e., 16 QAM) is used for the closer UE with respect to the base station (i.e., the first UE) and the lower order modulation scheme (i.e., QPSK) is used for the further UE with respect to the base station (i.e., the second UE).

In one example, at the first UE, the second signal modulated using QPSK is the interfering signal to the first signal modulated using 16 QAM that is designated for the first UE. Since QPSK is a low order modulation for the second signal, the second signal can be decoded by the first UE and cancelled prior to decoding the first signal. In other words, the first UE can receive both the first signal designated for the first UE and the second signal designated for the second UE. The first signal modulated using 16 QAM is the useful signal to the first UE, and the second signal modulated using QPSK is the interfering signal to the first UE. Since the first UE is located nearer to the base station, the first UE can decode the second signal (i.e., the interference signal modulated using QPSK) and cancel the second signal prior to demodulation of the first signal (i.e., the useful signal modulated using 16 QAM).

Similarly, at the second UE, the first signal modulated using 16 QAM is the interfering signal to the second signal modulated using QPSK that is designated for the second UE. However, interference due to the first signal modulated using 16 QAM is usually not significant. In some cases, at the second UE, interference from neighboring cells can be higher than the interference created by the first signal modulated using 16 QAM. Therefore, the interference from the first signal modulated using 16 QAM can be considered as additive noise, and the second UE generally does not perform any interference mitigation techniques when demodulating the second signal modulated using QPSK.

As an example, by properly allocating a modulation and coding scheme (MCS) and power distribution (P1 and P2) among the first and second signals, both the first UE and the second UE can receive the signals. More specifically, since the relative noise level of the first UE is lower than the relative noise level of the second UE, the first UE can also receive the second signal for the second UE. The first UE can treat the second signal as interference. The first UE can subtract the second signal designated for the second UE (which is interference from the first UE's point of view) from the first signal, and the first UE can demodulate the remaining signal in the presence of noise. As long as the MCS for the first UE does not exceed a capacity of the channel without any interference, the first UE can receive the first and second signals.

As described in further detail below, the first signal can be a first physical multicast channel (PMCH) signal and the second signal can be a second PMCH signal. The first and second signals can be transmitted to first and second UEs, respectively, as part of a multimedia broadcast multicast service (MBMS) in LTE.

Figure 2A:
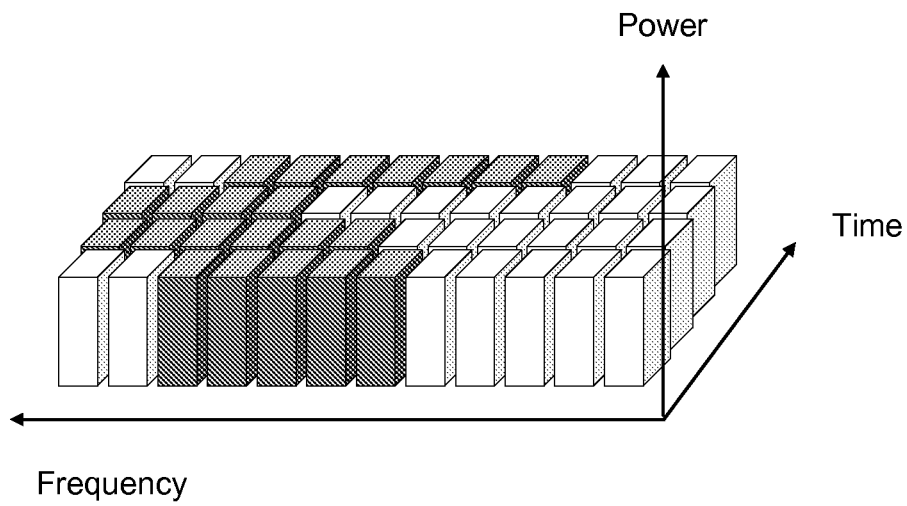
FIG. 2A illustrates time or frequency orthogonal multiplexing in accordance with an example.

FIG. 2A illustrates an example of time or frequency orthogonal multiplexing. The orthogonal multiplexing can be represented in terms of time, frequency and power. In orthogonal multiplexing, different time and frequency resources can be assigned to different user equipments (UEs). In other words, different physical resource blocks (PRBs) can be assigned to different UEs. In one example, the time and frequency resources are assigned in accordance with a total transmit power of an eNodeB.

Figure 2B:
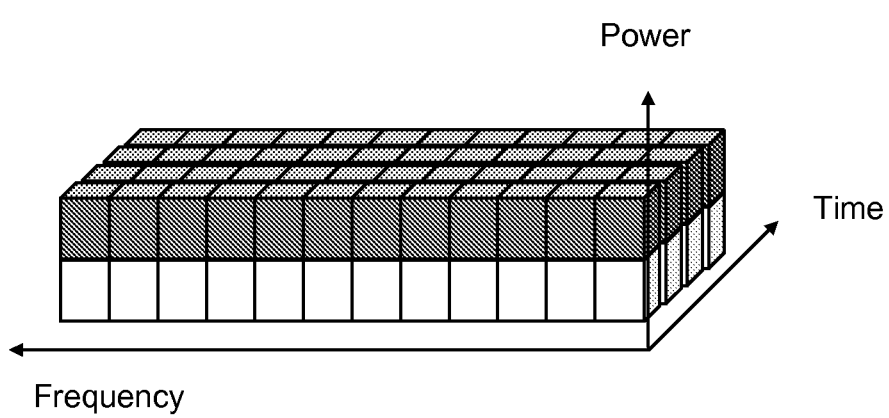
FIG. 2B illustrates time or frequency non-orthogonal multiplexing in accordance with an example.

FIG. 2B illustrates an example of time or frequency non-orthogonal multiplexing. The non-orthogonal multiplexing can be represented in terms of time, frequency and power. In non-orthogonal multiplexing, the same time and frequency resources can be assigned to different user equipments (UEs). In other words, the same physical resource blocks (PRBs) can be assigned to different UEs. In non-orthogonal multiplexing, a total transmit power of an eNodeB can be split amongst the different signals sent to the different UEs. In non-orthogonal multiplexing, the total transmit power of the eNodeB is not increased, but rather, the amount of power distribution changes for the different UEs. In one example, non-orthogonal multiplexing in LTE can provide enhanced performance as compared to orthogonal multiplexing.

Figure 3:
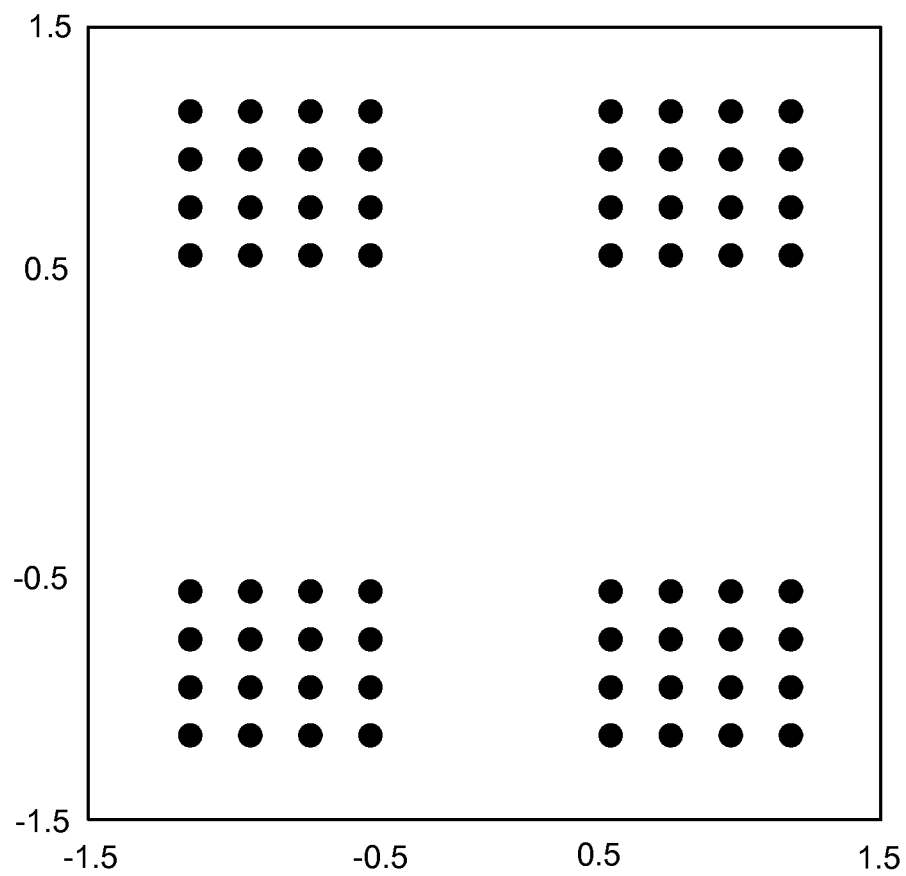
FIG. 3 illustrates an aggregated constellation of a multiplexed signal transmitted from a base station to multiple user equipments (UEs) in accordance with an example.

FIG. 3 illustrates an example of an aggregated constellation of a multiplexed signal transmitted from a base station to multiple user equipments (UEs). The multiplexed signal can include a first signal designated for a first UE and a second signal designated for a second UE. The first UE can be located closer to the base station as compared to the second UE. In one example, the first signal can be modulated using a higher order modulation scheme, such as 16 QAM (quadrature amplitude modulation), and the second signal can be modulated using a lower order modulation scheme, such as quadrature phase shift keying (QPSK).

In one example, the aggregated constellation can comprise the multiplexing of the first signal modulated using 16 QAM and the second signal modulated using QPSK. In other words, the aggregated constellation can represent a superposition of the first and second signals modulated using 16 QAM and QPSK, respectively. As shown in FIG. 3, the first signal modulated using 16 QAM is represented by 16 points, and the second signal modulated using QPSK is represented by 4 points. The aggregated (or composite) constellation can be derived by taking a linear combination of all possible points in a QPSK constellation and a 16 QAM constellation.

In one example, the aggregated constellation can be defined based on the power split between the first and second signals. A total transmit power (P) associated with the eNodeB can be split among the two signals. The total power split can be defined by $\alpha 1$ and $\alpha 2$. For superposition transmission schemes, depending on the propagation condition (i.e., high propagation loss or low propagation loss), $\alpha 1$ and $\alpha 2$ are parameters that define the power split between the two signals. An optimal $\alpha 1$ and $\alpha 2$ can depend on a propagation difference between the first UE and the second UE. In the example shown in FIG. 3, the first signal modulated using 16 QAM and the second signal modulated using QPSK can approximately have a 10 decibel (dB) power difference.

In one example, the receiver UE, such as the first UE or the second UE, can receive the aggregated constellation from the eNodeB, wherein the aggregated constellation comprises the first signal modulated using 16 QAM and the second signal modulated QPSK. When the receiving UE is located closer to the base station, such as the first UE, the second signal modulated using QPSK would be the interference signal for the first UE. However, since the second signal is a low order modulation signal (i.e., modulated using QPSK), the second signal can be cancelled prior to demodulation of the first signal modulated using 16 QAM. On the other hand, when the receiving UE is located further away from the base station, such as the second UE, the first signal modulated using 16 QAM would be the interference signal for the second UE. However, at the second UE, the interference due to the first signal modulated using 16 QAM is generally insignificant. In some cases, the interference from the first signal modulated using 16 QAM can be less than the interference at the second UE from neighboring cells. Therefore, the second UE generally does not perform any interference mitigation techniques when demodulating the second signal modulated using QPSK.

In one configuration, LTE provides support of multimedia broadcast multicast service (MBMS) services in addition to conventional unicast transmissions. MBMS, which is specified in 3GPP TS 26.346 Releases 6-12, is a point-to-multipoint interface specification designed to provide efficient delivery of broadcast and multicast services. MBMS is utilized on cellular networks operating in accordance with one of the cellular standards promulgated by the 3GPP. MBMS can be applicable to mobile television (TV) and radio broadcasting, as well as file delivery and emergency alerts. In some examples, MBMS can be used to send video transmissions to UEs or to enable UEs to download applications. In LTE-A, MBMS is typically provided in a synchronized network based on simultaneous transmission of the same information from multiple transmission points/cell using the same carrier frequency. The simultaneous transmission of the same information from multiple transmission points can occur in a MBMS single frequency network (MBSFN). Since the same data transmission in the MBSFN is performed by multiple cells or transmission points, the resource allocation and transport block format (e.g., modulation and coding scheme, transport block size) cannot be changed dynamically by the eNodeB and decided by a Multicast Coordination Entity (MCE) on the long-term basis.

Figure 4:
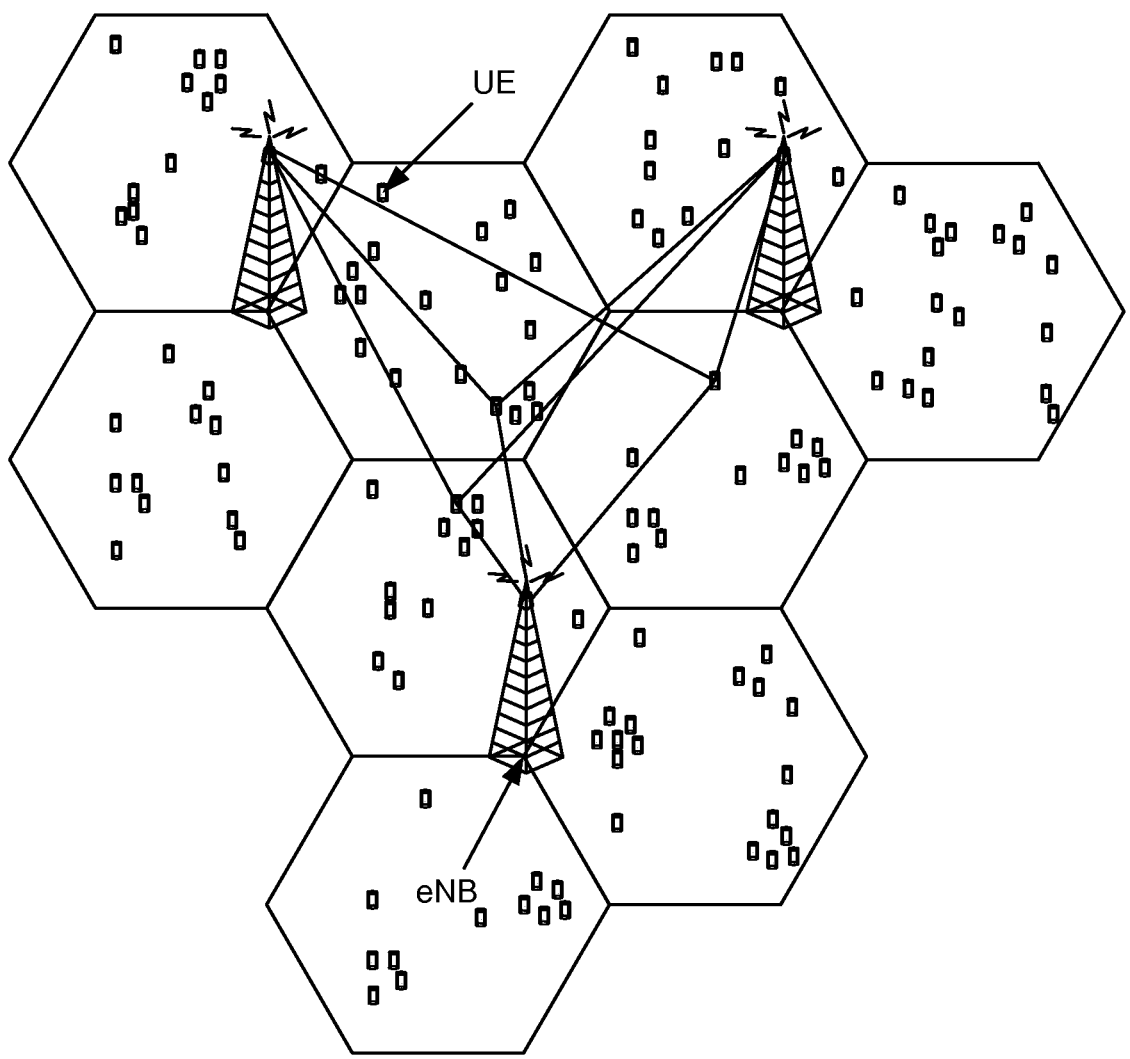
FIG. 4 illustrates a multimedia broadcast multicast service (MBMS) transmission from multiple base stations in accordance with an example.

FIG. 4 illustrates an example of a multimedia broadcast multicast service (MBMS) transmission from multiple base stations. In this example, the MBMS transmissions can occur in a MBMS single frequency network (MBSFN). The MBSFN network can be a synchronized network, and some of the downlink subframes can be configured as MBSFN subframes. In these MBSFN subframes, multiple eNodeBs can transmit the same information with the same modulation order, and using the same time and frequency resources (e.g., the same PRBs). In other words, the subframes which can be used for MBMS transmissions can be referred to as MBSFN subframes, which can be configured to the UEs using higher layer signaling, such as radio resource control (RRC) signaling.

In one example, each MBSFN subframe can include a control region with 1 or 2 OFDM symbol(s), and a MBSFN region occupying remaining OFDM symbols of the MBSFN subframe. The control region of the MBMS subframe can contain physical layer control channel which are transmitted in a unicast manner using cell-specific reference signal (CRS) antenna ports (0-3). The MBSFN region of the MBMS subframe can be transmitted in a multicast manner using MBSFN reference signals (antenna port 4) and physical multicast channel (PMCH) signals. The PMCH signals can include MBMS traffic and control information, and the PMCH signals can be transmitted with the MBSFN reference signals (RS).

In one example, the MBSFN reference signals can be used for equalization of the PMCH transmissions. The MBSFN reference signals can be transmitted on antenna port 4 with PMCH and is defined for an extended cyclic prefix (CP) length. The PMCH signals can be transmitted periodically in the MBSFN region of the MBSFN subframes. The modulation types for the PMCH signals can be QPSK, 16 QAM, 64 QAM or 256 QAM, and the modulation type for the MBSFN reference signals can be QPSK.

In one example, due to single frequency network (SFN) transmissions, the signals from different transmission points can be combined at the UE receiver. Compared to the unicast transmission, cell edge users are in the MBMS subframe area. In some cases, not all eNodeBs are transmitting the same information. Rather, only a set of eNodeBs transmit the same information in the MBMS subframe area. The transmission parameters can be controlled by a special entity referred to as the multicast coordination entity (MCE). This entity controls the PMCH parameters. The MCE can control the MBMS transmissions, as well as configure the modulation coding schemes for the UEs. The MCE can inform the eNodeB on what kind of modulation coding scheme should be used for the PMCH transmission.

Figure 5:
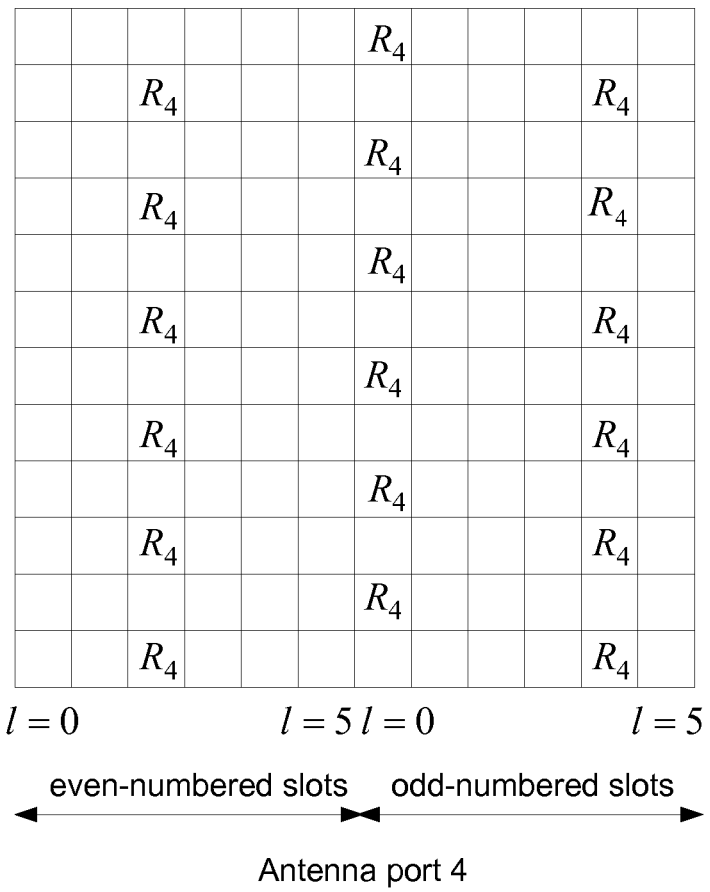
FIG. 5 illustrates a mapping of Multicast Broadcast Single Frequency Network (MBSFN) reference signals in accordance with an example.

FIG. 5 illustrates an exemplary mapping of Multicast Broadcast Single Frequency Network (MBSFN) reference signals. As shown in FIG. 5, reference elements designated as $R_4$ can indicate MBSFN reference signals. These MBSFN reference signals can be transmitted in a similar manner as physical multicast channel (PMCH) information, which is typically transmitted by multiple transmission points. These MBSFN reference signals are transmitted such that the UE can estimate a composite channel from all of the eNodeBs in order to perform demodulation of the received signal on MBMS.

As further described in 3GPP TS 36.213 Section 5.2, the eNodeB can determine the downlink power allocation, and in particular, the eNodeB can determine the downlink transit energy per resource element (EPRE). When a PMCH signal is modulated using 16 QAM, 64 QAM or 256 QAM, the transmit power of the MBSFN reference signal is the same as the transmit power of the PMCH signal. In other words, the UE can assume that the ratio of PMCH EPRE to MBSFN RS EPRE is equal to 0 decibels (dB).

In one example, a PMCH transmission parameter can be configured via higher lay signaling using a PMCH information list (PMCH-InfoList) information element (IE), which includes an indication of the MCS used for the PMCH transmission via a dataMCS-r12 parameter.

The technology described herein extends the operation of non-orthogonal multiplexing to MBMS. In other words, multiuser superposition transmissions can be performed for MBMS. Multiuser superposition transmissions on the PMCH can be facilitated by power control signaling for PMCH signals, which can indicate the ratio of PMCH EPRE to MBSFN RS EPRE. Multiuser superposition transmissions on the PMCH can be facilitated by signaling of at least two scrambling identities, wherein the scrambling identities are used to scramble coded bits corresponding to the non-orthogonally multiplexed signals. In addition, multiuser superposition transmissions on the PMCH can be facilitated by at least two PMCH allocations that are overlapping in time and frequency.

As previously described, the physical multicast channel (PMCH) is the control channel that defines the physical layer structure to carry Multimedia Broadcast and Multicast Services (MBMS). The PMCH can occupy the first 1, 2, or 3 OFDM symbols in a subframe extending over the entire system bandwidth. QPSK, 16 QAM, or 64 QAM modulations can be applied to the PMCH signals. In addition, the PMCH can include a multicast channel (MCH), wherein the MCH is characterized by a requirement to be broadcast in the entire coverage area of the cell. The MCH can be characterized by support for support for MBSFN combining of MBMS transmission on multiple cells. Also, the MCH can be characterized by support for semi-static resource allocation, e.g., with a time frame of a long cyclic prefix.

FIG. 6 is exemplary abstract syntax notation (ASN) code describing a physical multicast channel (PMCH) information list information element (IE). A PMCH transmission parameter can be configured via higher layer signaling using the PMCH information list IE. In one example, the PMCH information list IE can specify configurations of all PMCHs of a particular MBSFN area. The information provided for an individual PMCH can include the configuration parameters of the sessions that are carried by the individual PMCH.

With respect to previous solutions in MBMS, the modulation coding scheme (MCS) can be selected to guarantee reception of the PMCH signal for a large fraction of the UEs (e.g., 95-97% of UEs should be capable of receiving the PMCH signal). In this case, the MCS selection (e.g., QPSK or 16 QAM selection) is typically based on the worst-case UE. For example, there could be a large fraction of the UEs with a high SNR, and there could be some UEs with low SINR and low modulation order (e.g., the worst-case UEs). In this case, the MCS selection is based on the worst-case UEs that have low SINR, thereby ensuring that a majority of the worst-case UEs still receive the PMCH signal. To ensure that the majority of the worst-case UEs receive the PMCH signal, a low MCS can be selected. As a result, the UEs with high SINR can a significant margin. The MCS would be low order but the SINR will be high, so there is a relatively large difference between propagation conditions and the actual used MCS for PMCH transmissions.

In MBMS, PMCH signals can include MBMS traffic and control information, and the PMCH signals can be transmitted with MBSFN reference signals (RS). In one configuration, different PMCH signals can be multiplexed and transmitted to multiple UEs from a base station in accordance with a multiuser superposition transmission scheme for MBMS. For example, a first PMCH signal with high order MCS can be multiplexed with the second PMCH signal with low order MCS. By using non-orthogonal multiplexing, the first PMCH signal and the second PMCH signal can be transmitted using resources that are partially or fully overlapped in time and frequency. A fraction of the power used for the first PMCH signal with high order MCS can be used for the transmission of the second PMCH signal with low order MCS. In one example, the first PMCH signal can be designated for a first UE, wherein the first UE is located closer to the base station. The second PMCH signal can be designated for a second UE, wherein the second UE is located further away from the base station in relation to the first UE. In another example, the high order MCS associated with the first PMCH signal is 16 QAM, and the low order MCS associated with the second PMCH signal is QPSK.

In one example, the first UE (which is closer to the base station) can simultaneously receive both the first PMCH signal (i.e., the high order modulation signal) and the second PMCH signal (i.e., the low order modulation signal). The first UE can use both the first and second PMCH signals as useful signals. In other words, the first UE can demodulate both the first and second PMCH signals. The second UE (which is further away from the base station) can receive both the first and second PMCH signal, but the second UE can observe the first PMCH signal as some additional signal interference. In this case, the second UE can only decode the second PMCH signal and not the first PMCH signal.

In one example, with respect to the first UE which is located closer to the base station, the second PMCH signal with low order MCS (e.g., QPSK) is not considered interference to the first UE. In other words, the first UE can use the second PMCH signal as a useful signal. Similar to conventional multiuser superposition schemes, the first UE can receive the first PMCH signal with high order MCS and the second PMCH signal with low order MCS, and the first UE can decode the second PMCH signal with low order MCS. In conventional multiuser superposition schemes, the first UE can decode the second PMCH signal with low order MCS only to cancel interference. However, when multiuser superposition is applied to MBMS, the first UE can use both the first PMCH signal with high order MCS and the second PMCH signal with low order MCS as useful signals. Therefore, useful information is contained in the second PMCH signal as well as the first PMCH signal.

In one example, due to the first UE being closer to the base station as compared to the second UE (which results in lower propagation loss), a relative noise level can be lower for the first UE as compared to the second UE. In addition, since the first UE has a lower propagation loss as compared to the second UE, the signal to interference noise ratio (SINR) for the first UE is generally higher than the SINR for the second UE.

In one example, the first PMCH signal designated for the first UE can be allocated a relatively low fraction of a total transmit power associated with the base station, and the second PMCH signal designated for the second UE can be allocated a relatively high fraction of the total transmit power, based on the first UE being closer to the base station as compared to the second UE. In other words, the shorter distance between the base station and the first UE results in a lower power being allocated to the first PMCH signal, and the longer distance between the base station and the second UE results in a higher power being allocated to the second PMCH signal.

In one example, the first PMCH signal multiplexed with the second PMCH signal can be received from the base station at the UEs as an aggregation constellation. The aggregated constellation can comprise the multiplexing of the first PMCH signal modulated using 16 QAM and the second PMCH signal modulated using QPSK. In other words, the aggregated constellation can represent a superposition of the first and second PMCH signals modulated using 16 QAM and QPSK, respectively. In the aggregated constellation, the first PMCH signal modulated using 16 QAM can be represented by 16 points, and the second PMCH signal modulated using QPSK can be represented by 4 points. The aggregated (or composite) constellation can be derived by taking a linear combination of all possible points in a QPSK constellation and a 16 QAM constellation.

As an example, multiuser superposition transmission schemes can be used to improve video transmissions in MBMS. A video may have several layers. A basic video layer can be transmitted from a base station using a first PMCH signal, which is modulated using a low order modulation scheme, such as QPSK. In addition, an enhanced video layer can be transmitted from the base station using a second PMCH signal, which is modulated using a high order modulation scheme, such as 16 QAM. The enhanced video layer can include additional bits to improve the quality of the video. The basic video layer can be associated with a standard-definition video signal and the enhanced video layer can be associated with a high definition video signal. A first UE that is located in proximity to the base station, which results in low propagation loss, can receive both the first PMCH signal and the second PMCH signal. The first UE can receive the enhanced video layer multiplexed on top of the basic video layer. As a result, the quality of the video received at the first UE can be improved, due to the first UE receiving both the basic video layer and the enhanced video layer. For example, the combination of the basic video layer and the enhanced video layer can result in a high definition video, whereas the basic video layer alone can result in a standard quality video. On the other hand, a second UE that is located further away from the base station, which results in high propagation loss, may be only able to receive the first PMCH signal corresponding to the basic video layer. As a result, the second UE that is located further away may only be able to receive the standard quality video.

In one configuration, UEs in a MBSFN can receive multiplexed PMCH signals from the base station, wherein the PMCH signals are transmitted over the same time and frequency resources, such as the same physical resource blocks (PRBs). In previous solutions with respect to MBMS, only a single PMCH signal transmission was possible, whereas with the current technology, at least two PMCH signals can be transmitted over the same time and frequency resources. In one example, the base station can transmit various configuration parameters to the UEs to enable the UEs to decode/demodulate the multiplexed PMCH signals received from the base station. These configuration parameters can be related to a power allocation, a modulation order and different scrambling identities for the PMCH signals. Based on the power allocation, modulation order and scrambling identities, the UEs are enabled to decode the multiplexed PMCH signals. In other words, via the configuration parameters, the base station can configure the UEs to properly decode/demodulate the multiplexed PMCH signals received from the base station. In addition, MBSFN reference signals can be transmitted along with the multiplexed PMCH signals from the base station to the UEs.

In one example, power allocation signaling (or power offset signaling) can be signaled from the base station to the UEs. In order for the UE to demodulate the multiplexed PMCH signals, the UE needs to know the power split between the first PMCH signal with the high order MCS (e.g., 16 QAM) and the second PMCH signal with the low order MCS (e.g., QPSK). The power allocation signaling can include a parameter that indicates a portion of the total transmit power (i.e., the available amount of power) that is allocated to the first PMCH signal and a portion of the total transmit power that is allocated to the second PMCH signal, wherein the total transmit power is limited by the capabilities of the base station. One example of the parameter is a multicast channel (MCH) power allocation parameter, which can be represented by mch-Pa. In one example, the parameter (e.g., mch-Pa) in the power allocation signaling can be transmitted from the base station to the UEs via a PMCH Configuration Release 14 (PMCH-Config-r14) information element (IE). In addition, the parameter (e.g., mch-Pa) can define a power allocation between MBSFN reference signals and PMCH signals that are transmitted from the base station to the UEs. The parameter (e.g., mch-Pa) can define the ratio of PMCH EPRE to MBSFN RS EPRE. Furthermore, the parameter (e.g., mch-Pa) can indicate a value from a quantized set, wherein the quantized set can contain negative dB values to support power sharing between multiple signals. For example, the parameter (e.g., mch-Pa) can be defined as ENUMERATED with set of {dB-9, dB-6, dB-4dot77, dB-3, dB-1dot77, dB0, dB3, dB6} values.

In one example, MCS allocation signaling can be signaled from the base station to the UEs. The MCS allocation signaling can include additional MCS parameters, such as a Data MCS Release 14 (dataMCS-r14) parameter, that indicate modulation and coding schemes used for the multiple PMCH signals. In one example, the MCS allocation signaling can include two instances of a modulation and coding scheme, wherein each instance indicates the modulation and coding scheme (e.g., corresponding to QPSK, 16 QAM modulations) to be applied with respect to a particular PMCH signal. In previous solutions, MCS allocation signaling only contains one instance of a modulation and coding scheme because only one PMCH signal is transmitted over a given resource allocation.

In one example, the power allocation signaling can indicate a ratio of PMCH EPRE (for either the first PMCH signal or the second PMCH signal) to the MBSFN RS. In addition, the power allocation signaling can indicate a ratio of PMCH EPRE of the near UE (i.e., the UE located relatively close to the base station) to PMCH EPRE of the far UE (i.e., the UE located relatively far from the base station). In other words, the power allocation signaling can indicate the power offset between the first PMCH signal (associated with the near UE) and the second PMCH signal (associated with the far UE).

In one example, the MCS allocation signaling can be combined with the power allocation signaling. In other words, the MCS can be signaled together with the power offset, such that the UE knows how much power is allocated for each PMCH signal and the type of modulation associated with each PMCH signal. In one example, at least two instances of power allocation (e.g., mch-Pa) and at least two instances of MCS (e.g., dataMCS-r14) can be signaled to the UE as part of the PMCH Configuration Release 14 (PMCH-Config-r14) IE, where each instance of dataMCS-r12 and mch-Pa-r14 is used to describe PMCH signal parameters multiplexed in the same allocation with other PMCH signals. Alternatively, separate PMCH-Config-r14 IEs can be signaled to the UE, wherein a first PMCH-Config-r14 IE is for the power allocation and a second PMCH-Config-r14 IE is for the MCS allocation.

In one example, the UE can determine the power offset based on two multiplexed MBSFN subframe reference signals, and power offset information can be encoded in the two MBSFN subframe reference signals. As an example two MBSFN subframe reference signals can be associated with each PMCH signal. The power split between two MBSFN subframe reference signals can be the same as the power split between two PMCH signals. Once the UE performs estimation on these two MBSFN subframe reference signals, the channel estimation for each MBSFN subframe reference signal can also include the power scaling. In this case, there is no need to indicate the power split information to the UE because power scaling can be part of the channel estimation.

In one example, the base station can configure a scrambling identity for each PMCH signal. The different scrambling identities $n_{ID}^{MCH}$ can be assigned for two PMCH signals to scramble the coded bits before modulation. The $n_{ID}^{MCH}$ parameter can define the initialization for a pseudo-random sequence, and the $n_{ID}^{MCH}$ parameter can be signaled using higher layer signaling between the base station and the UE. Alternatively, the $n_{ID}^{MCH}$ parameter can be predefined in the specification. Based on the scrambling identity signaled to the UE, the UE is able to demodulate/decode each of the PMCH signals. In one example, two predefined values of $n_{ID}^{MCH}=0.1$ can be used for the first and second PMCH signals multiplexed in the same resource allocation. In other words, a predetermined scrambling identity for each PMCH signal can be determined by summing an existing pseudo random initialization value with i=0 or i=1, wherein i is an index of the non-orthogonally multiplexed PMCH signal.

In one example, the $n_{ID}^{MCH}$ parameter can be assigned two predefined values of 0 or 1. For instance, a first PMCH signal can be modulated by a random sequence generated when the $n_{ID}^{MCH}$ parameter is equal to 0. The second PMCH signal can be modulated by a random sequence generated when the $n_{ID}^{MCH}$ parameter is equal to 1. By using different scrambling codes, which is achieved by using initialization values and different $n_{ID}^{MCH}$ parameter values, the UE can potentially suppress interference from two PMCH signals that are multiplexed in the same resource element.

In one example, the $n_{ID}^{MCH}$ parameter can be used to determine an initialization for the scrambling generator. For each codeword q, the block of bits $b^{(q)}(0), \ldots, b^{(q)}(M_{bit}^{(q)}-1)$, where $M_{bit}^{(q)}$ is the number of bits in codeword q transmitted on the physical channel in one subframe, shall be scrambled prior to modulation, resulting in a block of scrambled bits $\tilde{b}^{(q)}(0), \ldots, \tilde{b}^{(q)}(M_{bit}^{(q)}-1)$ according to $\tilde{b}^{(q)}(i)=(b^{(q)}(i)+c^{(q)}(i)) \bmod 2$, wherein the scrambling sequence $c^{(q)}(i)$ is given by clause 7.2. The scrambling sequence generator shall be initialised at the start of each subframe, where the initialisation value of $c_{init}$ depends on the transport channel type according to $$c_{init} = \begin{cases} n_{RNTI} \cdot 2^{14} + q \cdot 2^{13} + \lfloor n_s/2 \rfloor \cdot 2^9 + N_{ID}^{cell} & \text{for } PDSCH \\ \lfloor n_s/2 \rfloor \cdot 2^9 + N_{ID}^{MBSFN} + n_{ID}^{MCH} & \text{for } PMCH \end{cases},$$

wherein $n_{RNTI}$ corresponds to the RNTI associated with the PDSCH transmission, as further described in 3GPP TS 36.213 Clause 7.1.

In one example, the base station can configure two or more multiplexed MBSFN reference signals in the same subframe for the UE. Each MBSFN reference signal can be associated with one of two (or more) non-orthogonally multiplexed PMCH signals that are also in the same subframe. More specifically, the base station can configure a scrambling identity for each MBSFN reference signal. The $n_{ID}^{RS}$ parameter can define the initialization for a pseudo-random sequence, and the $n_{ID}^{RS}$ parameter can be signaled using higher layer signaling between the base station and the UE. Alternatively, the $n_{ID}^{RS}$ parameter can be predefined in the specification. Based on the scrambling identity signaled to the UE, the UE is able to demodulate/decode each of the MBSFN reference signals. In one example, two predefined values of $n_{ID}^{RS}=0.1$ can be used for the first and second MBSFN reference signals (or the first and second PMCH signals) multiplexed in the same resource allocation. In other words, a predetermined scrambling identity can be used to modulate each MBSFN reference signal, wherein the predetermined scrambling identity can be determined by summing an existing pseudo random initialization value with i=0 or i=1, wherein i is an index of the non-orthogonally multiplexed PMCH signal.

Therefore, support of two MBSFN subframe reference signal multiplexing in the same subframe can be achieved by introducing additional scrambling parameters, or $n_{ID}^{RS}$, which can be assigned two predefined values of 0 or 1. For instance, a first MBSFN reference signal can be modulated by a random sequence generated when the $n_{ID}^{RS}$ parameter is equal to 0. The second MBSFN reference signal can be modulated by a random sequence generated when the $n_{ID}^{RS}$ parameter is equal to 1. By using different scrambling codes, which is achieved by using initialization values and different $n_{ID}^{RS}$ parameter values, the UE for channel estimation can potentially suppress interference from one MBSFN reference signal that is multiplexed in the same resource element as another MBSFN reference signal.

In one example, using the parameter $n_{ID}^{RS}$, different MBSFN reference signals can be obtained by using different initializations of a pseudo-random generator, wherein the pseudo-random generator can be used for generating a bit sequence for MBSFN RS modulation. For example, MBSFN reference signals can be transmitted in the MBSFN region of MBSFN subframes only when the PMCH signal is transmitted. MBSFN reference signals can be transmitted on antenna port 4. MBSFN reference signals are defined for extended cyclic prefix only. In one example, the MBSFN reference-signal sequence $r_{l,n_s}(m)$ is defined by $$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 6N_{RB}^{max,DL} - 1,$$

wherein $n_s$ is the slot number within a radio frame and l is the OFDM symbol number within the slot. The pseudo-random sequence c(i), as further defined in 3GPP TS 36.213 Clause 7.2. The pseudo-random sequence generator can be initialized with $c_{init}=2^9 \cdot (7 \cdot (n_s+1)+l+1) \cdot (2 \cdot N_{ID}^{MBSFN}+1)+N_{ID}^{MBSFN}+n_{ID}^{RS}$ at the start of each OFDM symbol.

Figure 7:
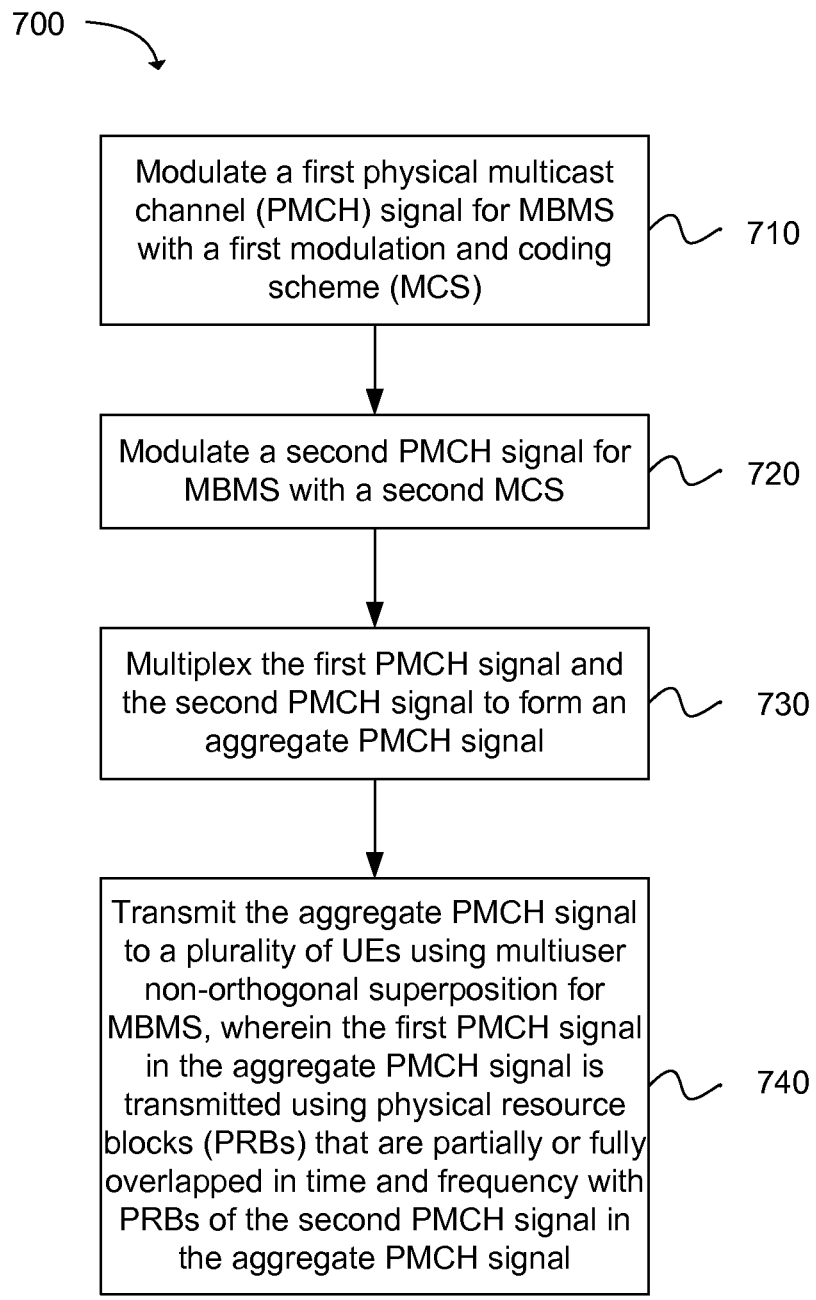
FIG. 7 depicts functionality of an eNodeB operable to perform multiuser non-orthogonal superposition transmissions for multimedia broadcast multicast service (MBMS) in accordance with an example.

Another example provides functionality 700 of an eNodeB operable to perform multiuser non-orthogonal superposition transmissions for multimedia broadcast multicast service (MBMS), as shown in the flow chart in FIG. 7. The functionality can be implemented as a method or the functionality can be executed as instructions on a machine, where the instructions are included on at least one computer readable medium or one non-transitory machine readable storage medium. The eNodeB can comprise one or more processors configured to: modulate a first physical multicast channel (PMCH) signal for MBMS with a first modulation and coding scheme (MCS), as in block 710. The eNodeB can comprise one or more processors configured to: modulate a second PMCH signal for MBMS with a second MCS, as in block 720. The eNodeB can comprise one or more processors configured to: multiplex the first PMCH signal and the second PMCH signal to form an aggregate PMCH signal, as in block 730. The eNodeB can comprise one or more processors configured to: transmit the aggregate PMCH signal to a plurality of UEs using multiuser non-orthogonal superposition for MBMS, wherein the first PMCH signal in the aggregate PMCH signal is transmitted using physical resource blocks (PRBs) that are partially or fully overlapped in time and frequency with PRBs of the second PMCH signal in the aggregate PMCH signal, as in block 740.

Figure 8:
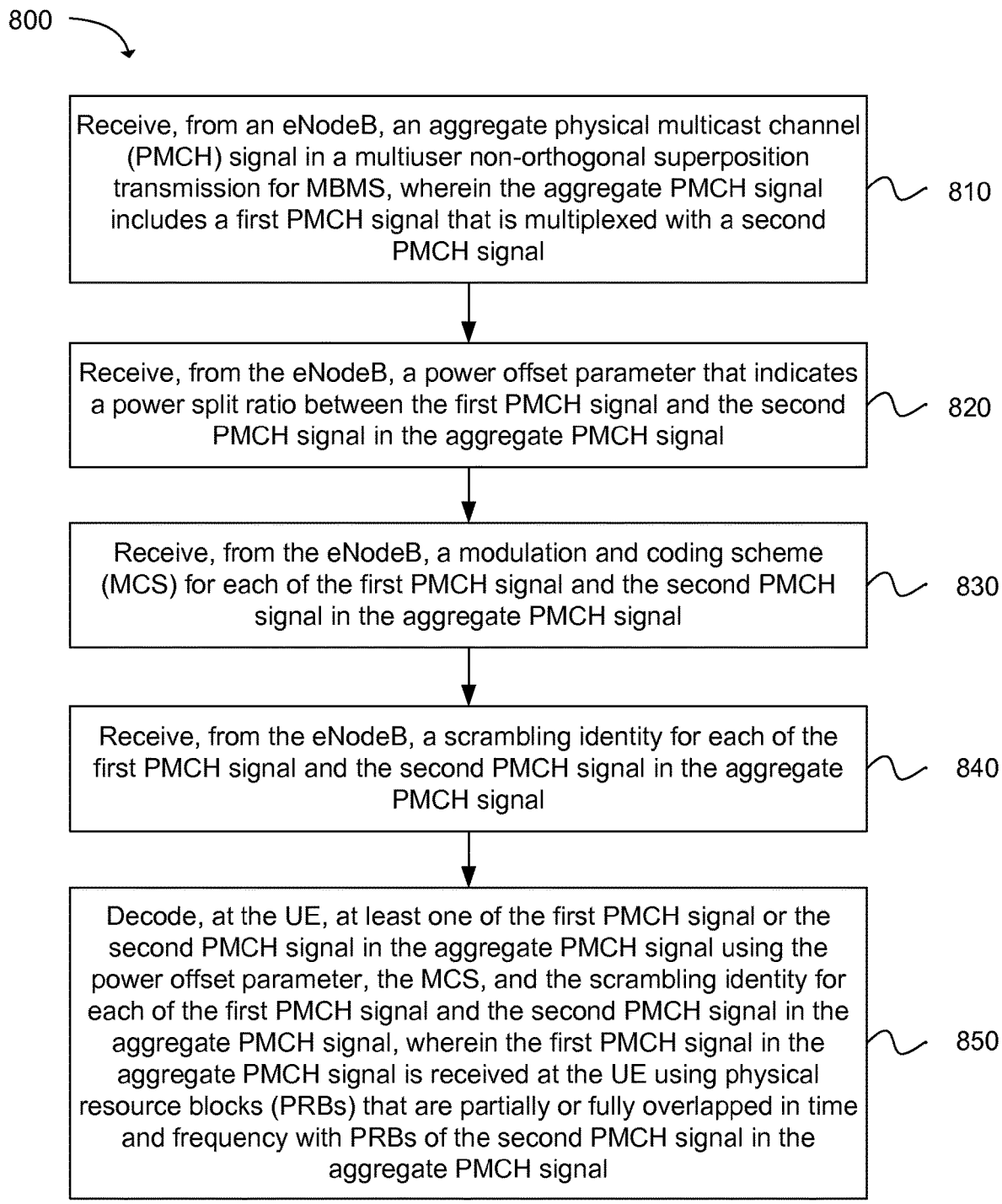
FIG. 8 depicts functionality of a user equipment (UE) operable to receive multiuser non-orthogonal superposition transmissions for multimedia broadcast multicast service (MBMS) in accordance with an example.

Another example provides functionality 800 of a user equipment (UE) operable to receive multiuser non-orthogonal superposition transmissions for multimedia broadcast multicast service (MBMS), as shown in the flow chart in FIG. 8. The functionality can be implemented as a method or the functionality can be executed as instructions on a machine, where the instructions are included on at least one computer readable medium or one non-transitory machine readable storage medium. The UE can comprise one or more processors configured to: receive, from an eNodeB, an aggregate physical multicast channel (PMCH) signal in a multiuser non-orthogonal superposition transmission for MBMS, wherein the aggregate PMCH signal includes a first PMCH signal that is multiplexed with a second PMCH signal, as in block 810. The UE can comprise one or more processors configured to: receive, from the eNodeB, a power offset parameter that indicates a power split ratio between the first PMCH signal and the second PMCH signal in the aggregate PMCH signal, as in block 820. The UE can comprise one or more processors configured to: receive, from the eNodeB, a modulation and coding scheme (MCS) for each of the first PMCH signal and the second PMCH signal in the aggregate PMCH signal, as in block 830. The UE can comprise one or more processors configured to: receive, from the eNodeB, a scrambling identity for each of the first PMCH signal and the second PMCH signal in the aggregate PMCH signal, as in block 840. The UE can comprise one or more processors configured to: decode, at the UE, at least one of the first PMCH signal or the second PMCH signal in the aggregate PMCH signal using the power offset parameter, the MCS, and the scrambling identity for each of the first PMCH signal and the second PMCH signal in the aggregate PMCH signal, wherein the first PMCH signal in the aggregate PMCH signal is received at the UE using physical resource blocks (PRBs) that are partially or fully overlapped in time and frequency with PRBs of the second PMCH signal in the aggregate PMCH signal, as in block 850.

Figure 9:
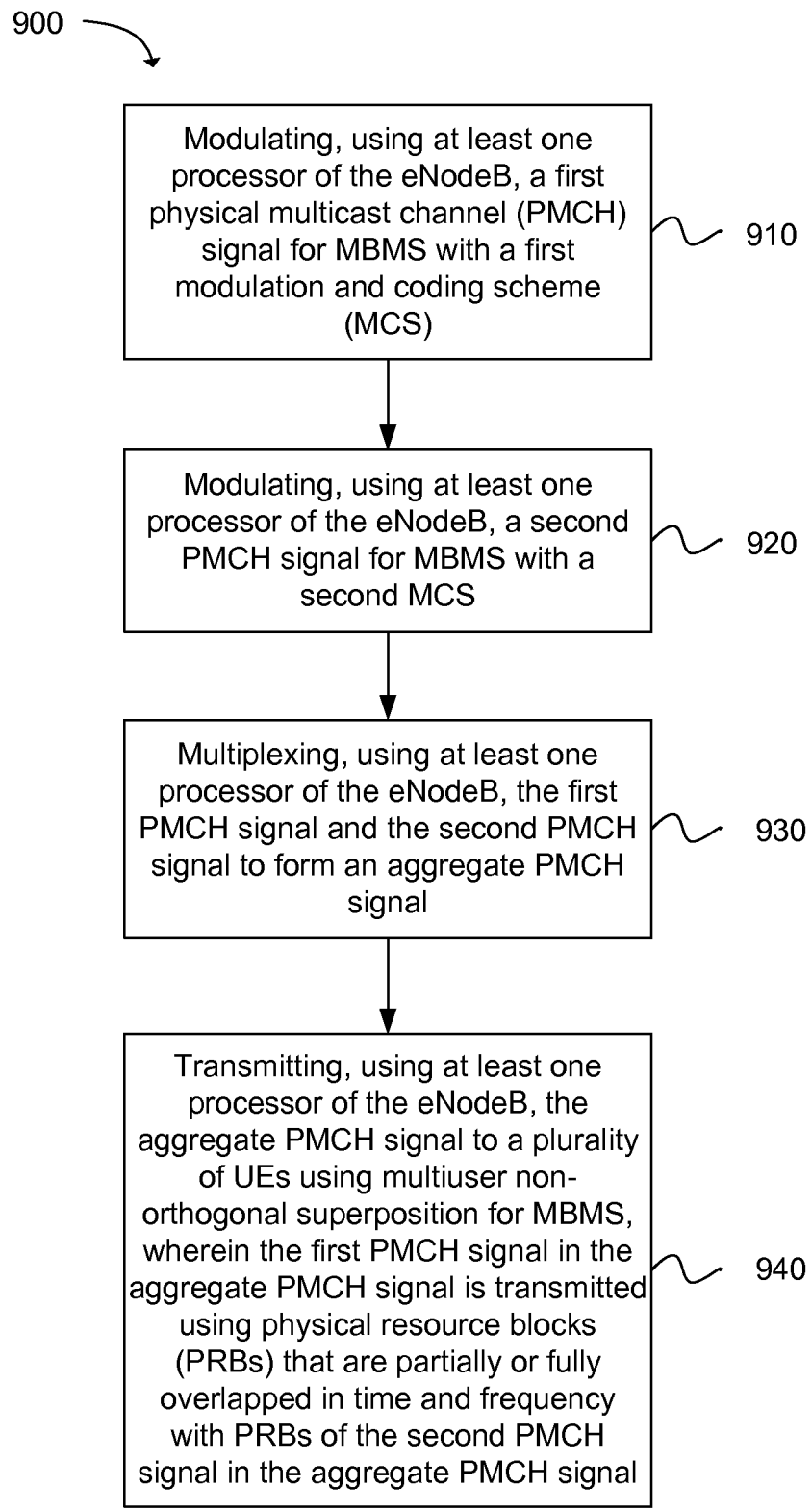
FIG. 9 depicts a flowchart of a non-transitory machine readable storage medium having instructions embodied thereon for performing multiuser non-orthogonal superposition transmissions at an eNodeB for multimedia broadcast multicast service (MBMS) in accordance with an example.

Another example provides at least one non-transitory machine readable storage medium having instructions 900 embodied thereon for performing multiuser non-orthogonal superposition transmissions at an eNodeB for multimedia broadcast multicast service (MBMS), as shown in the flow chart in FIG. 9. The method can be executed as instructions on a machine, where the instructions are included on at least one computer readable medium or one non-transitory machine readable storage medium. The instructions when executed perform: modulating, using at least one processor of the eNodeB, a first physical multicast channel (PMCH) signal for MBMS with a first modulation and coding scheme (MCS), as in block 910. The instructions when executed perform: modulating, using at least one processor of the eNodeB, a second PMCH signal for MBMS with a second MCS, as in block 920. The instructions when executed perform: multiplexing, using at least one processor of the eNodeB, the first PMCH signal and the second PMCH signal to form an aggregate PMCH signal, as in block 930. The instructions when executed perform: transmitting, using at least one processor of the eNodeB, the aggregate PMCH signal to a plurality of UEs using multiuser non-orthogonal superposition for MBMS, wherein the first PMCH signal in the aggregate PMCH signal is transmitted using physical resource blocks (PRBs) that are partially or fully overlapped in time and frequency with PRBs of the second PMCH signal in the aggregate PMCH signal, as in block 940.

Figure 10:
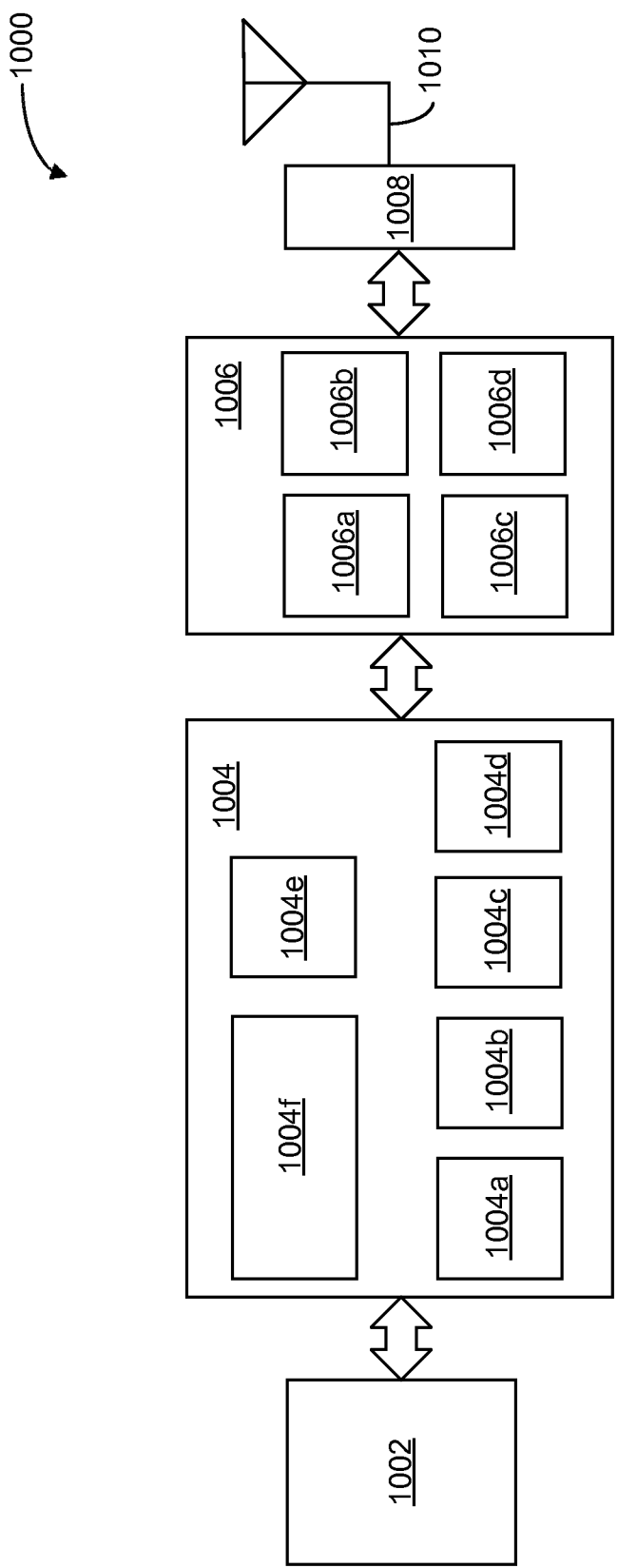
FIG. 10 illustrates a diagram of a wireless device (e.g., UE) in accordance with an example.

FIG. 10 provides an example illustration of a user equipment (UE) device 1000, such as a wireless device, a mobile station (MS), a mobile wireless device, a mobile communication device, a tablet, a handset, or other type of wireless device. The UE device 1000 can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The UE device 1000 can be configured to communicate using at least one wireless communication standard including 3GPP LTE, WiMAX, High Speed Packet Access (HSPA), Bluetooth, and WiFi. The UE device 1000 can communicate using separate antennas for each wireless communication standard or shared antennas for multiple wireless communication standards. The UE device 1000 can communicate in a wireless local area network (WLAN), a wireless personal area network (WPAN), and/or a WWAN.

In some embodiments, the UE device 1000 may include application circuitry 1002, baseband circuitry 1004, Radio Frequency (RF) circuitry 1006, front-end module (FEM) circuitry 1008 and one or more antennas 1010, coupled together at least as shown.

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1004 may include circuitry such as, but not limited to, one or more single-core or multi-core processors. The baseband circuitry 1004 may include one or more baseband processors and/or control logic to process baseband signals received from a receive signal path of the RF circuitry 1006 and to generate baseband signals for a transmit signal path of the RF circuitry 1006. Baseband processing circuity 1004 may interface with the application circuitry 1002 for generation and processing of the baseband signals and for controlling operations of the RF circuitry 1006. For example, in some embodiments, the baseband circuitry 1004 may include a second generation (2G) baseband processor 1004a, third generation (3G) baseband processor 1004b, fourth generation (4G) baseband processor 1004c, and/or other baseband processor(s) 1004d for other existing generations, generations in development or to be developed in the future (e.g., fifth generation (5G), 6G, etc.). The baseband circuitry 1004 (e.g., one or more of baseband processors 1004a-d) may handle various radio control functions that enable communication with one or more radio networks via the RF circuitry 1006. The radio control functions may include, but are not limited to, signal modulation/demodulation, encoding/decoding, radio frequency shifting, etc. In some embodiments, modulation/demodulation circuitry of the baseband circuitry 1004 may include Fast-Fourier Transform (FFT), precoding, and/or constellation mapping/demapping functionality. In some embodiments, encoding/decoding circuitry of the baseband circuitry 1004 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1004e of the baseband circuitry 1004 may be configured to run elements of the protocol stack for signaling of the PHY, MAC, RLC, PDCP and/or RRC layers. In some embodiments, the baseband circuitry may include one or more audio digital signal processor(s) (DSP) 104f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1004 and the application circuitry 1002 may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1004 is configured to support radio communications of more than one wireless protocol may be referred to as multi-mode baseband circuitry.

The RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. RF circuitry 1006 may include a receive signal path which may include circuitry to down-convert RF signals received from the FEM circuitry 1008 and provide baseband signals to the baseband circuitry 1004. RF circuitry 1006 may also include a transmit signal path which may include circuitry to up-convert baseband signals provided by the baseband circuitry 1004 and provide RF output signals to the FEM circuitry 1008 for transmission.

In some embodiments, the RF circuitry 1006 may include a receive signal path and a transmit signal path. The receive signal path of the RF circuitry 1006 may include mixer circuitry 1006a, amplifier circuitry 1006b and filter circuitry 1006c. The transmit signal path of the RF circuitry 1006 may include filter circuitry 1006c and mixer circuitry 1006a. RF circuitry 1006 may also include synthesizer circuitry 1006d for synthesizing a frequency for use by the mixer circuitry 1006a of the receive signal path and the transmit signal path. In some embodiments, the mixer circuitry 1006a of the receive signal path may be configured to down-convert RF signals received from the FEM circuitry 1008 based on the synthesized frequency provided by synthesizer circuitry 1006d. The amplifier circuitry 1006b may be configured to amplify the down-converted signals and the filter circuitry 1006c may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals, although this is not a requirement. In some embodiments, mixer circuitry 1006a of the receive signal path may comprise passive mixers, although the scope of the embodiments is not limited in this respect.

In some embodiments, the mixer circuitry 1006a of the transmit signal path may be configured to up-convert input baseband signals based on the synthesized frequency provided by the synthesizer circuitry 1006d to generate RF output signals for the FEM circuitry 1008. The baseband signals may be provided by the baseband circuitry 1004 and may be filtered by filter circuitry 1006c. The filter circuitry 1006c may include a low-pass filter (LPF), although the scope of the embodiments is not limited in this respect.

In some embodiments, the mixer circuitry 1006a of the receive signal path and the mixer circuitry 1006a of the transmit signal path may include two or more mixers and may be arranged for quadrature down-conversion and/or up-conversion respectively. In some embodiments, the mixer circuitry 1006a of the receive signal path and the mixer circuitry 1006a of the transmit signal path may include two or more mixers and may be arranged for image rejection (e.g., Hartley image rejection). In some embodiments, the mixer circuitry 1006a of the receive signal path and the mixer circuitry 1006a may be arranged for direct down-conversion and/or direct up-conversion, respectively. In some embodiments, the mixer circuitry 1006a of the receive signal path and the mixer circuitry 1006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1004 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006d may be a fractional-N synthesizer or a fractional N/N+1 synthesizer, although the scope of the embodiments is not limited in this respect as other types of frequency synthesizers may be suitable. For example, synthesizer circuitry 1006d may be a delta-sigma synthesizer, a frequency multiplier, or a synthesizer comprising a phase-locked loop with a frequency divider.

The synthesizer circuitry 1006d may be configured to synthesize an output frequency for use by the mixer circuitry 1006a of the RF circuitry 1006 based on a frequency input and a divider control input. In some embodiments, the synthesizer circuitry 1006d may be a fractional N/N+1 synthesizer.

In some embodiments, frequency input may be provided by a voltage controlled oscillator (VCO), although that is not a requirement. Divider control input may be provided by either the baseband circuitry 1004 or the applications processor 1002 depending on the desired output frequency. In some embodiments, a divider control input (e.g., N) may be determined from a look-up table based on a channel indicated by the applications processor 1002.

Synthesizer circuitry 1006d of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter.

FEM circuitry 1008 may include a receive signal path which may include circuitry configured to operate on RF signals received from one or more antennas 1010, amplify the received signals and provide the amplified versions of the received signals to the RF circuitry 1006 for further processing. FEM circuitry 1008 may also include a transmit signal path which may include circuitry configured to amplify signals for transmission provided by the RF circuitry 1006 for transmission by one or more of the one or more antennas 1010.

In some embodiments, the FEM circuitry 1008 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by RF circuitry 1006), and one or more filters to generate RF signals for subsequent transmission (e.g., by one or more of the one or more antennas 1010.

In some embodiments, the UE device 1000 may include additional elements such as, for example, memory/storage, display (e.g., touch screen), camera, antennas, keyboard, microphone, speakers, sensor, and/or input/output (I/O) interface.

EXAMPLES

The following examples pertain to specific invention embodiments and point out specific features, elements, or steps that can be used or otherwise combined in achieving such embodiments.

Example 1 includes an apparatus of an eNodeB operable to perform multiuser non-orthogonal superposition transmissions for multimedia broadcast multicast service (MBMS), the apparatus comprising one or more processors and memory configured to: modulate a first physical multicast channel (PMCH) signal for MBMS with a first modulation and coding scheme (MCS); modulate a second PMCH signal for MBMS with a second MCS; multiplex the first PMCH signal and the second PMCH signal to form an aggregate PMCH signal; and transmit the aggregate PMCH signal to a plurality of UEs using multiuser non-orthogonal superposition for MBMS, wherein the first PMCH signal in the aggregate PMCH signal is transmitted using physical resource blocks (PRBs) that are partially or fully overlapped in time and frequency with PRBs of the second PMCH signal in the aggregate PMCH signal.

Example 2 includes the apparatus of Example 1, further configured to transmit a power offset parameter to the plurality of UEs to enable the UEs to decode the aggregate PMCH signal, the power offset parameter indicating a power split ratio between the first PMCH signal and the second PMCH signal in the aggregate PMCH signal.

Example 3 includes the apparatus of any of Examples 1-2, wherein the power offset parameter indicates a ratio of PMCH Energy per Resource Element (EPRE) to a multicast broadcast single frequency network (MBSFN) reference signal (RS) EPRE for the first PMCH signal and the second PMCH signal.

Example 4 includes the apparatus of any of Examples 1-3, wherein the power offset parameter indicates a defined value from a quantized set of negative decibel (dB) values that support power sharing between multiple PMCH signals.

Example 5 includes the apparatus of any of Examples 1-4, further configured to transmit the first MCS and the second MCS to one or more UEs, wherein a first UE located relatively close to the eNodeB is configured to demodulate the first PMCH signal and the second PMCH signal in the aggregate PMCH signal, wherein a second UE located relatively far from the eNodeB is configured to demodulate only the second PMCH signal in the aggregate PMCH signal.

Example 6 includes the apparatus of any of Examples 1-5, further configured to transmit a power offset parameter, the first MCS and the second MCS to the plurality of UEs using a PMCH configuration information element (IE), the power offset parameter and the two instances of the MCS enabling the UEs to decode the first PMCH signal and the second PMCH signal in the aggregate PMCH signal.

Example 7 includes the apparatus of any of Examples 1-6, further configured to: scramble the first PMCH signal using a first pseudo-random sequence when a first scrambling identity ($n_{ID}^{MCH}$) assigned to the first PMCH signal is a first defined value; scramble the second PMCH signal using a second pseudo-random sequence when a second scrambling identity ($n_{ID}^{MCH}$) assigned to the second PMCH signal is a second defined value; and communicate the first scrambling identity ($n_{ID}^{MCH}$) and the second scrambling identity ($n_{ID}^{MCH}$) to the plurality of UEs to enable the plurality of UEs to decode the first PMCH signal and the second PMCH signal in the aggregate PMCH signal Example 8 includes the apparatus of any of Examples 1-7, further configured to: identify a first multicast broadcast single frequency network (MBSFN) reference signal (RS) and a second MBSFN RS, wherein the first MBSFN RS is associated with the first PMCH signal and the second MBSFN RS is associated with the second PMCH signal; and transmit the first MBSFN RS and the second MBSFN RS with the aggregate PMCH signal to the plurality of UEs.

Example 9 includes the apparatus of any of Examples 1-8, further configured to: assign a first scrambling identity ($n_{ID}^{RS}$) to the first MBSFN RS and a second scrambling identity ($n_{ID}^{RS}$) to the second MBSFN RS, wherein the first MBSFN RS is scrambled using the first scrambling identity ($n_{ID}^{RS}$) and the second MBSFN RS is scrambled using the second scrambling identity ($n_{ID}^{RS}$), wherein the first scrambling identity ($n_{ID}^{RS}$) and the second scrambling identity ($n_{ID}^{RS}$) are predefined values Example 10 includes the apparatus of any of Examples 1-9, wherein a ratio of PMCH Energy per Resource Element (EPRE) between the first PMCH signal and the second PMCH signal is the same as a ratio of MBSFN RS EPRE between the first MBSFN RS and the second MBSFN RS.

Example 11 includes the apparatus of any of Examples 1-10, wherein the first PMCH signal is modulated using quadrature amplitude modulation (QAM) and the first PMCH signal is a designated signal for a first UE in the plurality of UEs.

Example 12 includes the apparatus of any of Examples 1-11, wherein the second PMCH signal is modulated using quadrature phase shift keying (QPSK) and the second PMCH signal is interference that is utilized as a useful signal at a second UE in the plurality of UEs.

Example 13 includes an apparatus of a user equipment (UE) operable to receive multiuser non-orthogonal superposition transmissions for multimedia broadcast multicast service (MBMS), the apparatus comprising one or more processors and memory configured to: receive, from an eNodeB, an aggregate physical multicast channel (PMCH) signal in a multiuser non-orthogonal superposition transmission for MBMS, wherein the aggregate PMCH signal includes a first PMCH signal that is multiplexed with a second PMCH signal; receive, from the eNodeB, a power offset parameter that indicates a power split ratio between the first PMCH signal and the second PMCH signal in the aggregate PMCH signal; receive, from the eNodeB, a modulation and coding scheme (MCS) for each of the first PMCH signal and the second PMCH signal in the aggregate PMCH signal; receive, from the eNodeB, a scrambling identity for each of the first PMCH signal and the second PMCH signal in the aggregate PMCH signal; and decode, at the UE, at least one of the first PMCH signal or the second PMCH signal in the aggregate PMCH signal using the power offset parameter, the MCS, and the scrambling identity for each of the first PMCH signal and the second PMCH signal in the aggregate PMCH signal, wherein the first PMCH signal in the aggregate PMCH signal is received at the UE using physical resource blocks (PRBs) that are partially or fully overlapped in time and frequency with PRBs of the second PMCH signal in the aggregate PMCH signal.

Example 14 includes the apparatus of Example 13, wherein the power offset parameter indicates a defined value from a quantized set of negative decibel (dB) values that support power sharing between multiple PMCH signals.

Example 15 includes the apparatus of any of Examples 13-14, wherein the power offset parameter and the MCS for each of the first PMCH signal and the second PMCH signal in the aggregate PMCH signal are simultaneously received from the eNodeB in a PMCH configuration information element (IE).

Example 16 includes the apparatus of any of Examples 13-15, further configured to: receive, from the eNodeB, a first multicast broadcast single frequency network (MBSFN) reference signal (RS) associated with the first PMCH signal and a second MBSFN RS associated with the second PMCH signal; receive, from the eNodeB, scrambling identity $(n_{ID}^{RS})$ used to scramble each of the first MBSFN RS and the second MBSFN RS signal; and decode, at the UE, at least one of the first MBSFN RS or the second MBSFN RS based on scrambling identities $(n_{ID}^{RS})$ received from the eNodeB Example 17 includes the apparatus of any of Examples 13-16, wherein a ratio of PMCH Energy per Resource Element (EPRE) between the first PMCH signal and the second PMCH signal is the same as a ratio of MBSFN RS EPRE between the first MBSFN RS and the second MBSFN RS.

Example 18 includes the apparatus of any of Examples 13-17, wherein the first PMCH signal is modulated using quadrature amplitude modulation (QAM) and the first PMCH signal is a designated signal for the UE.

Example 19 includes the apparatus of any of Examples 13-18, wherein the second PMCH signal is modulated using quadrature phase shift keying (QPSK) and the second PMCH signal is interference that is utilized as a useful signal at the UE.

Example 20 includes the apparatus of any of Examples 13-19, wherein the first PMCH signal in the aggregate PMCH signal is a high order modulation signal and the second PMCH signal in the aggregate PMCH signal is a low order modulation signal.

Example 21 includes at least one non-transitory machine readable storage medium having instructions embodied thereon for performing multiuser non-orthogonal superposition transmissions at an eNodeB for multimedia broadcast multicast service (MBMS), the instructions when executed perform the following: modulating, using at least one processor of the eNodeB, a first physical multicast channel (PMCH) signal for MBMS with a first modulation and coding scheme (MCS); modulating, using at least one processor of the eNodeB, a second PMCH signal for MBMS with a second MCS; multiplexing, using at least one processor of the eNodeB, the first PMCH signal and the second PMCH signal to form an aggregate PMCH signal; and transmitting, using at least one processor of the eNodeB, the aggregate PMCH signal to a plurality of UEs using multiuser non-orthogonal superposition for MBMS, wherein the first PMCH signal in the aggregate PMCH signal is transmitted using physical resource blocks (PRBs) that are partially or fully overlapped in time and frequency with PRBs of the second PMCH signal in the aggregate PMCH signal.

Example 22 includes the at least one non-transitory machine readable storage medium of example 21, further comprising instructions which when executed by the at least one processor of the eNodeB performs the following: transmitting a power offset parameter to the plurality of UEs to enable the UEs to decode the aggregate PMCH signal, the power offset parameter indicating a power split ratio between the first PMCH signal and the second PMCH signal in the aggregate PMCH signal.

Example 23 includes the at least one non-transitory machine readable storage medium of any of Examples 21-22, further comprising instructions which when executed by the at least one processor of the eNodeB performs the following: transmitting a power offset parameter to the plurality of UEs to enable the UEs to decode the aggregate PMCH signal, the power offset parameter indicating a power split ratio between the first PMCH signal and the second PMCH signal in the aggregate PMCH signal.

Example 24 includes the at least one non-transitory machine readable storage medium of any of Examples 21-23, further comprising instructions which when executed by the at least one processor of the eNodeB performs the following: transmitting the first MCS and the second MCS to one or more UEs, wherein a first UE located relatively close to the eNodeB is configured to demodulate the first PMCH signal and the second PMCH signal in the aggregate PMCH signal, wherein a second UE located relatively far from the eNodeB is configured to demodulate only the second PMCH signal in the aggregate PMCH signal.

Example 25 includes the at least one non-transitory machine readable storage medium of any of Examples 21-24, further comprising instructions which when executed by the at least one processor of the eNodeB performs the following: identifying a first multicast broadcast single frequency network (MBSFN) reference signal (RS) and a second MBSFN RS, wherein the first MBSFN RS is associated with the first PMCH signal and the second MBSFN RS is associated with the second PMCH signal; and transmitting the first MBSFN RS and the second MBSFN RS with the aggregate PMCH signal to the plurality of UEs.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An apparatus of an eNodeB operable to perform multiuser non-orthogonal superposition transmissions for multimedia broadcast multicast service (MBMS), the apparatus comprising one or more processors and memory configured to:
   modulate a first physical multicast channel (PMCH) signal for MBMS with a first modulation and coding scheme (MCS);
   modulate a second PMCH signal for MBMS with a second MCS;
   multiplex the first PMCH signal and the second PMCH signal to form an aggregate PMCH signal; and
   transmit the aggregate PMCH signal to a plurality of UEs using multiuser non-orthogonal superposition for MBMS, wherein the first PMCH signal in the aggregate PMCH signal is transmitted using physical resource blocks (PRBs) that are partially or fully overlapped in time and frequency with PRBs of the second PMCH signal in the aggregate PMCH signal; and
   transmit a power offset parameter to the plurality of UEs to enable the UEs to decode the aggregate PMCH signal, the power offset parameter indicating a power split ratio between the first PMCH signal and the second PMCH signal in the aggregate PMCH signal, wherein the power offset parameter:
      indicates a ratio of PMCH Energy per Resource Element (EPRE) to a multicast broadcast single frequency network (MBSFN) reference signal (RS) EPRE for the first PMCH signal and the second PMCH signal; or indicates a defined value from a quantized set of negative decibel (dB) values that support power sharing between multiple PMCH signals.

2. The apparatus of claim 1, further configured to transmit the first MCS and the second MCS to one or more UEs, wherein a first UE located a first distance to the eNodeB is configured to demodulate the first PMCH signal and the second PMCH signal in the aggregate PMCH signal, wherein a second UE located a second distance from the eNodeB, that is greater than the first distance, is configured to demodulate only the second PMCH signal in the aggregate PMCH signal.

3. The apparatus of claim 1, further configured to transmit a power offset parameter, the first MCS and the second MCS to the plurality of UEs using a PMCH configuration information element (IE), the power offset parameter and the two instances of the MCS enabling the UEs to decode the first PMCH signal and the second PMCH signal in the aggregate PMCH signal.

4. The apparatus of claim 1, further configured to:
scramble the first PMCH signal using a first pseudo-random sequence when a first scrambling identity ($n_{ID}^{MCH}$) assigned to the first PMCH signal is a first defined value;
scramble the second PMCH signal using a second pseudo-random sequence when a second scrambling identity ($n_{ID}^{MCH}$) assigned to the second PMCH signal is a second defined value; and
communicate the first scrambling identity ($n_{ID}^{MCH}$) and the second scrambling identity ($n_{ID}^{MCH}$) to the plurality of UEs to enable the plurality of UEs to decode the first PMCH signal and the second PMCH signal in the aggregate PMCH signal.

5. The apparatus of claim 1, further configured to:
identify a first multicast broadcast single frequency network (MBSFN) reference signal (RS) and a second MBSFN RS, wherein the first MBSFN RS is associated with the first PMCH signal and the second MBSFN RS is associated with the second PMCH signal; and
transmit the first MBSFN RS and the second MBSFN RS with the aggregate PMCH signal to the plurality of UEs.

6. The apparatus of claim 5, further configured to: assign a first scrambling identity ($n_{ID}^{RS}$) to the first MBSFN RS and a second scrambling identity ($n_{ID}^{RS}$) to the second MBSFN RS, wherein the first MBSFN RS is scrambled using the first scrambling identity ($n_{ID}^{RS}$) and the second MBSFN RS is scrambled using the second scrambling identity ($n_{ID}^{RS}$), wherein the first scrambling identity ($n_{ID}^{RS}$) and the second scrambling identity ($n_{ID}^{RS}$) are predefined values.

7. The apparatus of claim 5, wherein a ratio of PMCH Energy per Resource Element (EPRE) between the first PMCH signal and the second PMCH signal is the same as a ratio of MBSFN RS EPRE between the first MBSFN RS and the second MBSFN RS.

8. The apparatus of claim 1, wherein the first PMCH signal is modulated using quadrature amplitude modulation (QAM) and the first PMCH signal is a designated signal for a first UE in the plurality of UEs.

9. The apparatus of claim 1, wherein the second PMCH signal is modulated using quadrature phase shift keying (QPSK) and the second PMCH signal is interference that is utilized as a useful signal at a second UE in the plurality of UEs.

10. An apparatus of a user equipment (UE) operable to receive multiuser non-orthogonal superposition transmissions for multimedia broadcast multicast service (MBMS), the apparatus comprising one or more processors and memory configured to:
receive, from an eNodeB, an aggregate physical multicast channel (PMCH) signal in a multiuser non-orthogonal superposition transmission for MBMS, wherein the aggregate PMCH signal includes a first PMCH signal that is multiplexed with a second PMCH signal;
receive, from the eNodeB, a power offset parameter that indicates a power split ratio between the first PMCH signal and the second PMCH signal in the aggregate PMCH signal;
receive, from the eNodeB, a modulation and coding scheme (MCS) for each of the first PMCH signal and the second PMCH signal in the aggregate PMCH signal;
receive, from the eNodeB, a scrambling identity for each of the first PMCH signal and the second PMCH signal in the aggregate PMCH signal; and
decode, at the UE, at least one of the first PMCH signal or the second PMCH signal in the aggregate PMCH signal using the power offset parameter, the MCS, and the scrambling identity for each of the first PMCH signal and the second PMCH signal in the aggregate PMCH signal,
wherein the first PMCH signal in the aggregate PMCH signal is received at the UE using physical resource blocks (PRBs) that are partially or fully overlapped in time and frequency with PRBs of the second PMCH signal in the aggregate PMCH signal; and
wherein the power offset parameter indicates a defined value from a quantized set of negative decibel (dB) values that support power sharing between multiple PMCH signals.

11. The apparatus of claim 10, wherein the power offset parameter and the MCS for each of the first PMCH signal and the second PMCH signal in the aggregate PMCH signal are simultaneously received from the eNodeB in a PMCH configuration information element (IE).

12. The apparatus of claim 10, further configured to:
receive, from the eNodeB, a first multicast broadcast single frequency network (MBSFN) reference signal (RS) associated with the first PMCH signal and a second MBSFN RS associated with the second PMCH signal;
receive, from the eNodeB, scrambling identity ($n_{ID}^{RS}$) used to scramble each of the first MBSFN RS and the second MBSFN RS signal; and
decode, at the UE, at least one of the first MBSFN RS or the second MBSFN RS based on scrambling identities ($n_{ID}^{RS}$) received from the eNodeB.

13. The apparatus of claim 12, wherein a ratio of PMCH Energy per Resource Element (EPRE) between the first PMCH signal and the second PMCH signal is the same as a ratio of MBSFN RS EPRE between the first MBSFN RS and the second MBSFN RS.

14. The apparatus of claim 10, wherein the first PMCH signal is modulated using quadrature amplitude modulation (QAM) and the first PMCH signal is a designated signal for the UE.

15. The apparatus of claim 10, wherein the second PMCH signal is modulated using quadrature phase shift keying (QPSK) and the second PMCH signal is interference that is utilized as a useful signal at the UE.

16. The apparatus of claim 10, wherein the first PMCH signal in the aggregate PMCH signal is a high order modulation signal and the second PMCH signal in the aggregate PMCH signal is a low order modulation signal.

17. At least one non-transitory machine readable storage medium having instructions embodied thereon for performing multiuser non-orthogonal superposition transmissions at an eNodeB for multimedia broadcast multicast service (MBMS), the instructions when executed perform the following:
- modulating, using at least one processor of the eNodeB, a first physical multicast channel (PMCH) signal for MBMS with a first modulation and coding scheme (MCS);
- modulating, using at least one processor of the eNodeB, a second PMCH signal for MBMS with a second MCS;
- multiplexing, using at least one processor of the eNodeB, the first PMCH signal and the second PMCH signal to form an aggregate PMCH signal; and
- transmitting, using at least one processor of the eNodeB, the aggregate PMCH signal to a plurality of UEs using multiuser non-orthogonal superposition for MBMS, wherein the first PMCH signal in the aggregate PMCH signal is transmitted using physical resource blocks (PRBs) that are partially or fully overlapped in time and frequency with PRBs of the second PMCH signal in the aggregate PMCH signal: and
- transmitting the first MCS and the second MCS to one or more UEs, wherein a first UE located a first distance relative to the eNodeB is configured to demodulate the first PMCH signal and the second PMCH signal in the aggregate PMCH signal, wherein a second UE located a second distance from the eNodeB, that is greater than the first distance, is configured to demodulate only the second PMCH signal in the aggregate PMCH signal.

18. The at least one non-transitory machine readable storage medium of claim 17, further comprising instructions which when executed by the at least one processor of the eNodeB performs the following: transmitting a power offset parameter to the plurality of UEs to enable the UEs to decode the aggregate PMCH signal, the power offset parameter indicating a power split ratio between the first PMCH signal and the second PMCH signal in the aggregate PMCH signal.

19. The at least one non-transitory machine readable storage medium of claim 17, further comprising instructions which when executed by the at least one processor of the eNodeB performs the following: transmitting a power offset parameter to the plurality of UEs to enable the UEs to decode the aggregate PMCH signal, the power offset parameter indicating a power split ratio between the first PMCH signal and the second PMCH signal in the aggregate PMCH signal.

20. The at least one non-transitory machine readable storage medium of claim 17, further comprising instructions which when executed by the at least one processor of the eNodeB performs the following:
- identifying a first multicast broadcast single frequency network (MBSFN) reference signal (RS) and a second MBSFN RS, wherein the first MBSFN RS is associated with the first PMCH signal and the second MBSFN RS is associated with the second PMCH signal; and
- transmitting the first MBSFN RS and the second MBSFN RS with the aggregate PMCH signal to the plurality of UEs.

* * * * *